United States Patent [19]

Mohn

[11] Patent Number: 5,083,905
[45] Date of Patent: Jan. 28, 1992

[54] LINEAR MOTOR POWERED PUMP UNIT

[75] Inventor: Frank Mohn, London, England

[73] Assignee: Framo Developments (UK) Limited, London, England

[21] Appl. No.: 319,148

[22] Filed: Mar. 8, 1989

[30] Foreign Application Priority Data

Mar. 8, 1988 [GB] United Kingdom ............... 8805420

[51] Int. Cl.$^5$ .............................................. F04B 49/00
[52] U.S. Cl. ...................................... 417/45; 417/418; 310/12; 318/135
[58] Field of Search ................. 417/417, 416, 418, 45; 310/12; 318/135

[56] References Cited

U.S. PATENT DOCUMENTS

| | | | |
|---|---|---|---|
| 3,364,864 | 1/1968 | Gheorghe | 417/418 |
| 4,334,180 | 6/1982 | Bramm et al. | 417/416 |
| 4,373,876 | 2/1983 | Nemoto | 417/539 |
| 4,470,771 | 9/1984 | Hall et al. | 417/346 |
| 4,509,001 | 4/1985 | Wakabayashi et al. | 318/135 |
| 4,527,954 | 7/1985 | Murali et al. | 417/346 |
| 4,528,466 | 7/1985 | von der Heide et al. | 310/12 |
| 4,607,197 | 8/1986 | Conrad | 310/12 |
| 4,687,054 | 8/1987 | Russell et al. | 417/417 |

FOREIGN PATENT DOCUMENTS

| | | |
|---|---|---|
| 0102780 | 3/1984 | European Pat. Off. . |
| 1955829 | 6/1970 | Fed. Rep. of Germany ........ 310/12 |
| 2360973 | 6/1974 | Fed. Rep. of Germany . |
| 3421463 | 1/1985 | Fed. Rep. of Germany . |
| 2106841 | 5/1972 | France . |
| 0002852 | 1/1987 | Japan ...................................... 310/12 |
| 0792515 | 1/1981 | U.S.S.R. ............................... 310/12 |
| 675958 | 7/1952 | United Kingdom . |

Primary Examiner—Richard A. Bertsch
Assistant Examiner—David W. Scheuermann
Attorney, Agent, or Firm—Young & Thompson

[57] ABSTRACT

A pump unit comprises a pump piston driven by a linear electric motor having induction and reaction members with closely adjacent flat surfaces. A reaction member can be sandwiched between two induction members. Co-operating induction and reaction members extend radially from a rod connected to the piston or to two axially spaced pistons or are grouped tangentially around it. The piston or pistons are driven synchronously and so that constant force is applied by way of a control system which includes a trajectory generator and a controller responsive to selected inputs relating to pump performance characteristics and feedback signals derived from measured current flow and piston position.

2 Claims, 4 Drawing Sheets

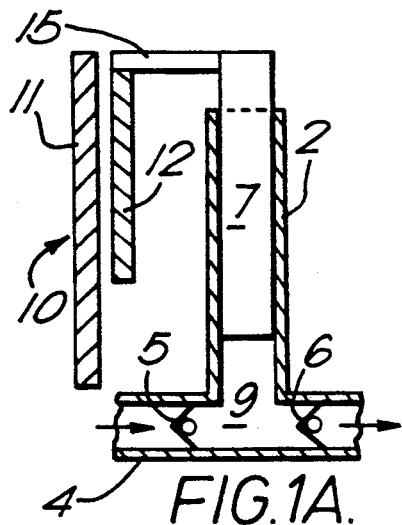
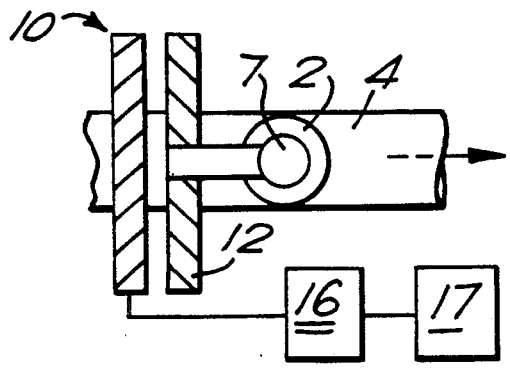
FIG.1A.
FIG.1B.
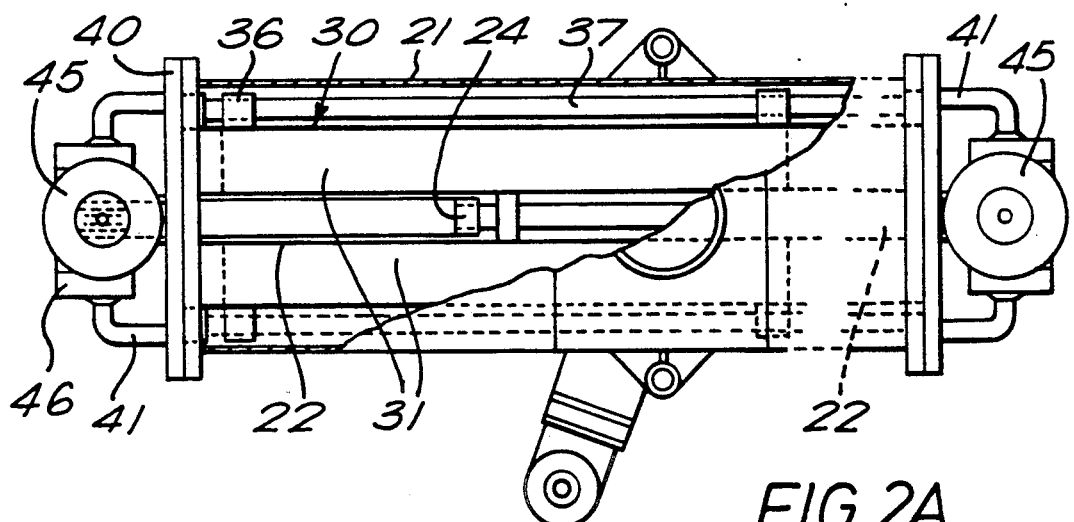
FIG.2A.
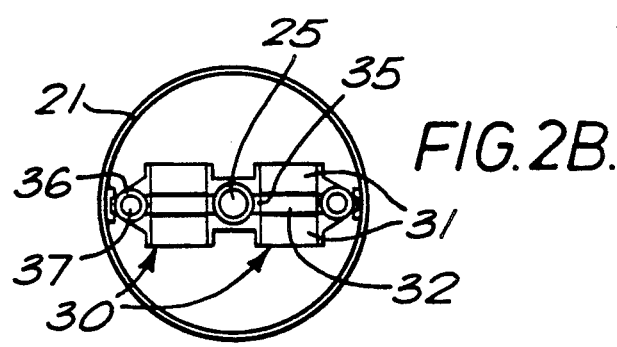
FIG.2B.

LINEAR MOTOR POWERED PUMP UNIT

FIELD OF THE INVENTION

The invention relates to an electrically powered pump unit and more specifically to such a pump unit comprising a pump element driven by a linear electric motor to perform a pumping operation.

BACKGROUND OF THE INVENTION

In conventional reciprocating pump units of this kind, the linear electric motor comprises an annular stator or drive member co-operating with a concentric annular "rotor" or reaction plate or driven member which is coupled with or which constitutes the reciprocating pump element.

It is an object of the invention to provide a pump unit driven by a linear electric motor of space-efficient configuration.

It is also an object of the invention to provide a control system for a pump driven by a linear electric motor which affords high efficiency operation.

SUMMARY OF THE INVENTION

The invention provides a pump unit having a reciprocably guided pump element driven by a linear electric motor, the motor comprising co-operating driving and driven members of substantially flat plate-like form.

The linear motor can be configured in a variety of ways in accordance with the invention. The direction of movement of the reaction member or plate is conveniently laterally spaced from and parallel to the direction of movement of the pump element, rather than being aligned with it; two or more of the flat linear electric motors can be connected to the piston element, preferably in a symmetrical arrangement around its direction of movement, with the parallel major surfaces of the stator and reaction plates extending tangentially or radially of this direction. Therefor each motor can be single, with one stator or drive plate, or double, with the reaction plate arranged to move between a pair of stator or drive plates.

To avoid the complications involved in supplying power to the driven or reaction member, this preferably constituted as a permanent magnet. The pump element/reaction plate assembly is to some extent guided by the guide means for the pump element within the pump structure, but because of the magnetic forces present, external guide means for the reaction plate are preferably provided to ensure that the reaction plate is held in the correct location relative to the stator plate or plates.

The stator or drive member is preferably energized to load the reaction member in both directions and so that the motor operates synchronously, to offer improved efficiency compared with asynchronous operation. The power supplied to the stator can be precisely controlled in respect of voltage and current and also in respect of frequency, conveniently by means of a frequency converter, so that constant force is applied to the reaction member. The induction member current phase can be locked to the reaction member position, so that the operation is like that of a D.C. machine.

The invention thus also provides a control system for a pump unit incorporating a linear electric motor, not necessarily operating reciprocably, and if reciprocating not necessarily of generally flat configuration, in which the power supply to the motor is controlled so as to effect a desired pump operation or pump element movement. The control can be responsive to one or more inputs relating to selected pump performance, for example, pumped fluid velocity, pumping force or stroke frequency, when the pump operates by reciprocation. A trajectory generator can be provided to produce a control signal representing a desired pump element movement. The control exercised can be monitored by feedback signals representing current flow in the motor and/or pump element position.

BRIEF DESCRIPTION OF THE DRAWINGS

The invention is further described below, by way of example, with reference to the accompanying drawings, in which:

FIGS. 1A and 1B are respectively schematic sectional side and plan views of a simple form of pump unit embodying the invention; and FIGS. 2A, 2B, 2C and 2D are respectively plan, cross-sectional, exploded interior, and end views of a second pump unit embodying the invention;

Figure 2C:
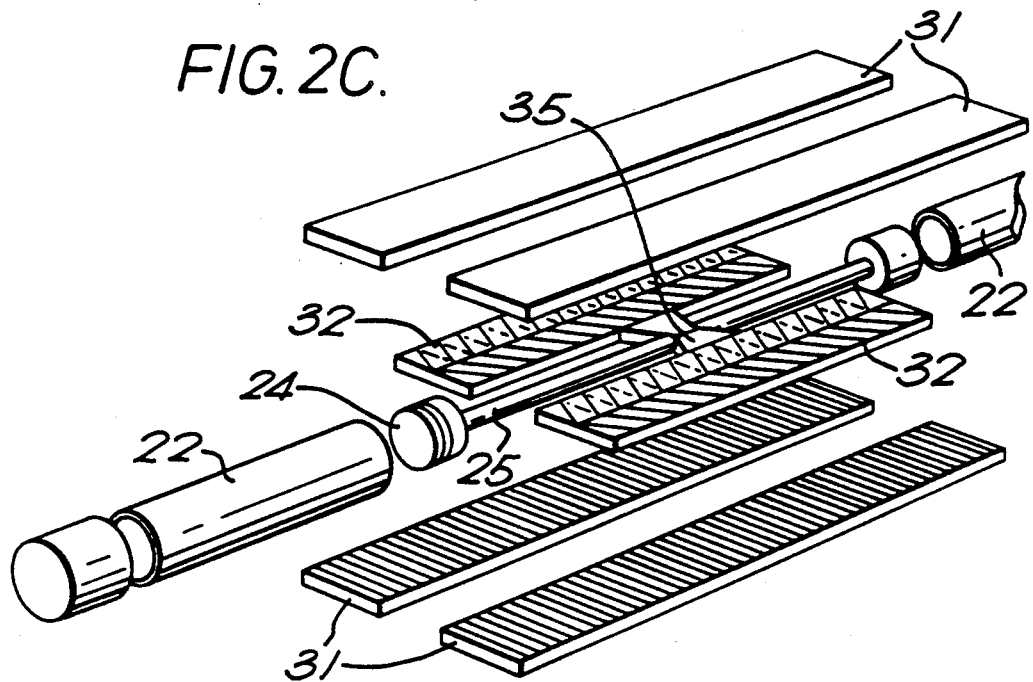
Figure 2D:
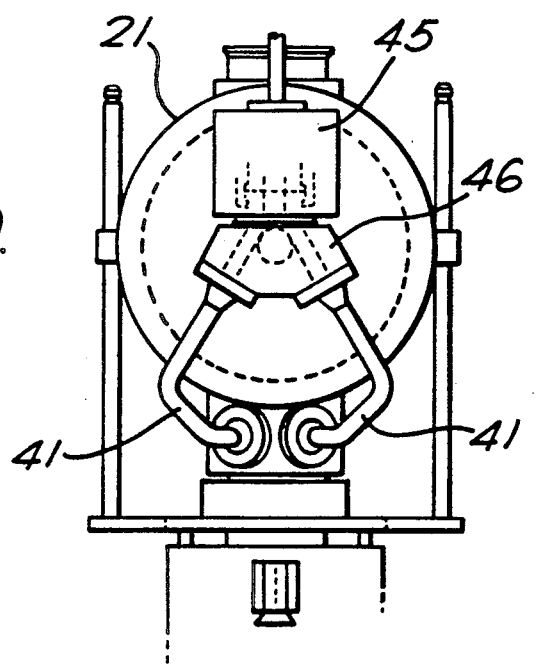

The pump unit schematically shown in FIGS. 1A and 1B comprises a pump cylinder 2 communicating at its lower end with a pipe line 4 containing non-return valves 5 and 6. A piston 7 extends downwardly into the pump cylinder 2 and is guided therein for axial reciprocation, so that a variable volume pump chamber 9 is defined beneath it and between the non-return valves. Upward movement of the piston 7 draws fluid into the pump chamber 9 through the valve 5 and downward movement expels the fluid along the pipe line through the valve 6.

In accordance with the invention the reciprocating movement of the piston 7 is effected by a linear electric motor 10 comprising a stator or drive member 11 in the form of a winding shaped as a flat rectangular plate, energization of which causes movement along its length of a "rotor" or reaction member 12 constituted by a strongly magnetized permanent magnet also shaped as a flat rectangular plate. The upper end of the reaction plate 12 is connected by an arm 15 to the upper end of the piston 7 which protrudes upwardly from the cylinder 2. Means is provided for guiding the assembly comprising the piston 7 and the reaction member 12 so that a major surface of the latter moves parallel to a major surface of the drive member 11 with only a minimum spacing therebetween.

Electric power is supplied to the drive member 11 through a frequency converter 16 from a source 17 so that the pump unit can be operated synchronously to ensure maximum power application to the piston 7.

The force applied to the piston can readily be increased by providing a second drive member, with the reaction member sandwiched between it and the drive member 11, and/or by provision of a second linear electric motor similar to the motor 10 located for example so as to be diametrically opposed from it across the piston 7.

The second pump unit embodying the invention, illustrated in FIGS. 2A, 2B, 2C and 2D, comprises a double-acting pump having a cylindrical housing 21 containing two axially spaced pump cylinders 22 extending to its ends. A piston 24 is reciprocably movable within each cylinder 22, and the two pistons are connected together by a piston rod 25 to form a piston assembly. The pistons 24 are advantageously sealed to the cylinder walls by sealing arrangements as described in British application 87 25 449, filed Oct. 30, 1987.

The piston assembly is reciprocably driven by two double sided linear electric motors 30, or by a motor having two parts located in the housing 21. Each motor is generally similar in construction to the motor 10 of FIGS. 1A and 1B, in as far as it comprises fixed drive or induction members 31 and movable reaction members 32 shaped as flat rectangular plates, the former containing electric windings and the latter comprising permanent magnets. The motors 30 however, being double sided, each comprise two drive plates or members 31 with the associated reaction member 32 sandwiched between them. The two motors 30 are diametrically opposed across the piston rod 25, to which the reaction members 32 are secured by a frame 35 which extends radially outwardly of the reaction members to mount cylindrical guide sleeves 36 slidable along guide rails 37 extending along the inner wall of the housing 21.

For maximum efficiency, the air gap between the reaction members 32 and the drive members 31 has to be kept small, and the guide means constituted by the guide sleeves 36 and the rails 37 keep the members apart in spite of any tendency to distortion during operation.

The outer end of each cylinder 22 communicates, through apertures in the adjacent end walls 40 of the housing 21, with suction and discharge piping 41 by way of non-return valves contained in a subhousing 45 detachably mounted on a support 46 secured to the end wall 40. The non-return valve arrangement is equivalent to that shown in FIG. 1A, so that reciprocation of the piston 24 within the cylinder 22 effects a pumping action, and the piping 41 extending from the two supports 46 are such that the pump unit as a whole operates as a double-acting pump. The suction and discharge paths for the pumped fluid are communicated through the join between the subhousing 45 and the support 46 by way of appropriate sealing means, and the detachable mounting of the subhousing permits the check valves it contains to be conveniently serviced without disassembly of the pump unit as a whole.

The third pump embodying the invention, shown in FIG. 3, corresponds to the pump of FIG. 3 except in respect of the features described below.

A hollow hexagonal support frame with walls 122 is received within a cylindrical housing 121 for support within it flat plate-like stator or induction members 131 of three linear electric motors 130, each also comprising a flat plate-like reaction member 132, which may again comprise a permanent magnet. Each induction member 131 is mounted to a respective wall 122 of the frame by means of brackets 123 so as to extend lengthwise of the housing. The walls 122 mounting the induction members 131 are spaced apart by the other three walls which carry on inwardly extending webs 124 longitudinally extending guide beams 125.

An inner frame 135 of hollow generally triangular cross-section mounts on each side of the flat reaction members 132 so that each extends closely parallel to a one of the induction members 131. The frame 135 is guided for movement axially of the housing 121 by the guide beams 125 which are received in grooves provided in the frame between the reaction members 132. Webs 136 extend inwardly from the walls of the hollow frame 135 to a piston rod 137 connected to pistons (not shown) functioning similarly to the pistons 24 of FIG. 2. The areas of the induction and drive members 131,132 can be large compared with the diameter of the housing 121, so the triangular pattern of the three motors is very efficient in respect of space and material.

Figure 3:
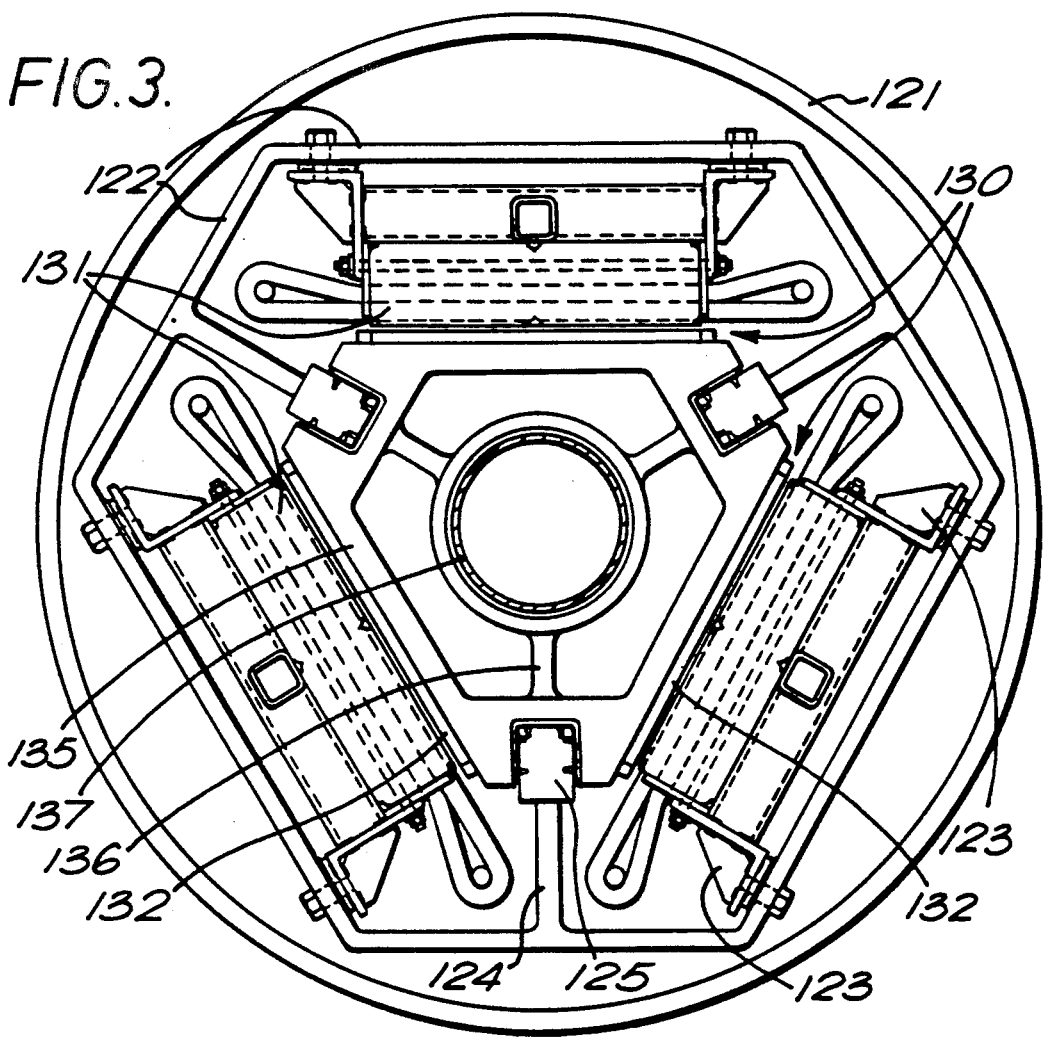
FIG. 3 is a cross-sectional view of a third pump embodying the invention.

In either of the pumps of FIGS. 2 and 3, the housing 21 is preferably filled with a protective fluid, conveniently a lubricating oil, within which the frame and the reaction members move. The fluid is maintained at a pressure at least as great as the maximum suction pressure exerted by the pump unit and it can be communicated to other parts of, for example, a sub-sea fluid extraction system of which the pump unit is a part, to function as a barrier fluid.

The motors of the pumps so far described are preferably energised so as to operate synchronously, and so that the piston or piston assembly is positively driven in both directions. For high efficiency operation, the currents in the or each drive or induction member is phased locked to the positions of the co-operating reaction member. This maximises the forces applied to the piston assembly, and the pump operates in the same way as direct current machines, with pulling forces directly proportional to the current. The piston assembly then has to be accelerated from a stationary position at an end of its stroke and then decelerated to a stationary position at the other end of the stroke. It must then undergo the same cycle in the other direction. The frequency of the supply to the stator member must consequently be changed from zero to a maximum and then back to zero, the cycle being repeated for the return stroke but with a shift of phase. In order to apply constant force to the piston assembly, the voltage also must be controlled so that a constant current flows in the winding of the drive member as the frequency varies from zero to its maximum.

Figure 4:
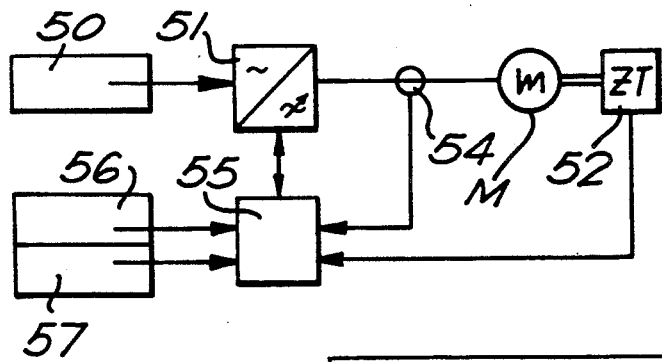
FIG. 4 is a schematic block circuit diagram of a control system of a pump unit of the kind shown in FIGS. 1, or 2.

A suitable control system for achieving this motor operation for a selected pump frequency and applied force is schematically shown in FIG. 4. Electrical power is supplied from an alternating current source 50 to the linear motor or motors M through a variable speed drive device 51 which may be a cyclo converter, or an inverter with current intermediate circuit, with variable intermediate voltage impulse amplitude modulation or with constant intermediate voltage and pulse width modulation. To obtain adequately close control, a position transducer 52 is provided to sense the position of the reaction member, either directly or in terms of the position of the piston assembly. The outputs of the position transducer 52, and of a sensor 54 responsive to the current actually flowing in the drive member or members, are applied to a control device 55, together with signals dependent on the selected pump frequency and pumping force from respective input devices 56 and 57. The control device 56 provides control signals for the variable speed device 51 so that this supplies power to the linear motor of appropriate frequency and voltage. The control system of FIG. 4 is applicable in accordance with the invention to the control of pump units including linear electric motors of any configuration, not excluding rotary pump units.

Figure 5:
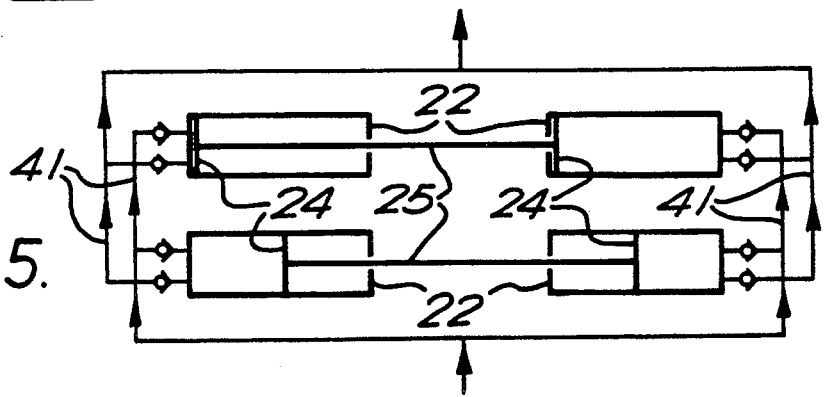
FIG. 5 schematically shows the layout of a fourth pump unit embodying the invention.

With the single acting pump configuration of FIGS. 1A and 1B or the double-acting pump configurations of FIGS. 2A, 2B, 2C and 2D, and FIG. 3, the power input and also the pumped fluid flow are pulsating. The pumped fluid is expelled from one cylinder during a first half cycle, during which the flow increases from zero to a maximum from which it is reduced again to zero. On the next half cycle, pumped fluid is similarly expelled from the other cylinder. In order to reduce non-uniformity of flow, two of the pump units of FIGS. 2A, 2B, 2C and 2D or of FIG. 3 can be connected together into a pump system as schematically shown in FIG. 5, and operated one quarter cycle out of phase. Other pump units could of course be employed.

In the position shown, with the lower piston assembly moving to the right at maximum speed, the upper piston assembly will shortly begin to move to begin to discharge as the discharge from upper right head cylinder begins to decline. Although the power demand of the system still pulsates, considerably smoother operation is obtained.

Figure 6:
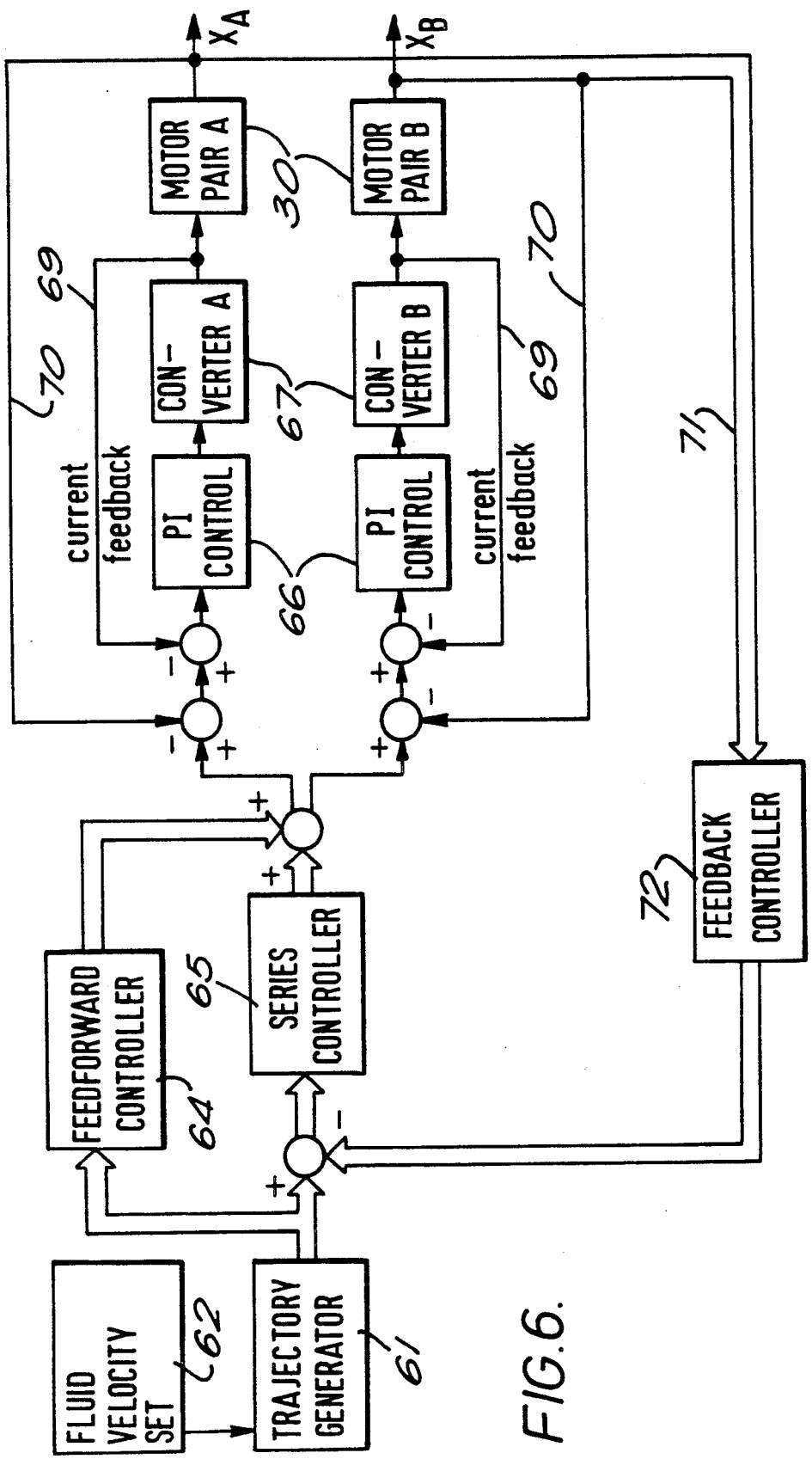
FIG. 6 is a schematic block circuit diagram for the control system for the pump unit of FIG. 5.

FIG. 6 shows control arrangements for the pump system of FIG. 5 which resemble those of FIG. 4 in providing for substantially constant input and output flow rates from the pump cylinders 22, and dynamic control of acceleration and deceleration of the piston assemblies between selected flow rates, and can additionally provide for safe shutdown of the pump system on occurrence of a supply failure or of any other fault conditions.

The control system of FIG. 6 comprises a trajectory generator 61 receiving an input representing a selected fluid velocity from an input device 62 and supplying signals to a feed forward controller 64 and a series controller 65. The pair of motors 30 of each pump unit of the pump system receives its power supply by way of a variable speed drive constituted by a proportional-plus-integral controller 66 and a converter 67. A first control loop 69 provides current feedback around each proportional-plus-integral controller 66 and the associated converter 67, the function of this innermost loop being to control and thereby limit current in the windings of the drive members 31 so as to prevent damage due to excess currents. Accurate control is ensured by the use of the proportional-plus-integral controllers 66.

Additionally, the converters 67 are phase-locked to the positions of the reaction members 32 by a second inner feedback loop 70 to ensure proper synchronous operation. To ensure this phase locking, the position of each reaction member 32 is constantly measured as in the system of FIG. 4 and the information fed back to the variable speed drive.

The two feed back loops so far described provide for efficient operation of the pump unit, and the motors 30 are made to follow the desired velocity profile by means of an outer position feedback loop 71 including a feedback controller 72, and by the feed forward controller 64.

When the pump unit is running at its operating speed, each motor pair will follow a constant acceleration and deceleration profile, and the control arrangements for following this trajectory operate by controlling position rather than velocity, because it is the piston assembly position which is the critical. The control scheme feedback loop 71 containing a feedback controller 72 and the series controller 65 in the forward path to ensure good regulation. Secondly, the feedforward controller 64 provides the necessary control to guarantee close following of the reference trajectory, which can be modified for example by feedback from the current output of one of the converters indicating excessive current demand.

The system of FIG. 6 can include in addition start-up procedures under which the peak velocity is gradually increased until the operating value is reached.

The system advantageously includes logic which continually monitors pump operation and causes the pump to decelerate to standstill on the detection of any fault condition. Also, in the event of loss of power, it can be arranged to effect isolation of the control lines and "dumping" of the kinetic energy of the system into a stator load, possibly a resistance bank, using the inherent ability of the permanent magnets of the reaction members 32 to generate, even though all electrical power is lost to the drive members 31.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. A control system for controlling operation of a double acting pump unit, said pump unit comprising a piston assembly and a linear electric motor for reciprocably driving said piston assembly to pump a fluid, said control system comprising:

input means for providing signals representing a desired operation of said pump unit, and control means responsive to said signals to generate an output for energizing said linear electric motor so as to achieve said desired operation of said pump unit, said control means comprising:

a trajectory generator and a series controller providing an output corresponding to a desired movement of said piston assembly, variable speed drive means responsive to said trajectory generated output to provide an output for energizing said linear electric motor, a feedforward controller, means connecting said feedforward controller in a loop across said series controller, a feedback controller, and means connecting said feedback controller across said series controller, said variable speed drive means and said linear electric motor.

2. A control system for controlling operation of a double acting pump unit, said pump unit comprising a piston assembly and a linear electric motor for reciprocably driving said piston assembly to pump a fluid, said control system comprising:

input means for providing signals representing a desired operation of said pump unit, and control means responsive to said signals to generate an output for energizing said linear electric motor so as to achieve said desired operation of said pump unit, said control means comprising:

a trajectory generator providing an output corresponding to a desired movement of said piston assembly, variable speed drive means responsive to said trajectory generated output to provide an output for energizing said linear electric motor, a first feedback loop across said variable speed drive means for controlling the current supplied to said linear electric motor, and a second feedback loop across said variable speed drive means and said linear electric motor for effecting synchronous operation of said motor.

* * * * *